United States Patent
Lim et al.

(10) Patent No.: US 9,758,726 B2
(45) Date of Patent: Sep. 12, 2017

(54) LIQUID CRYSTAL CELL

(71) Applicant: LG CHEM, LTD., Seoul (KR)

(72) Inventors: Eun Jung Lim, Daejeon (KR); Jung Woon Kim, Daejeon (KR); Dong Hyun Oh, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 14/889,760

(22) PCT Filed: Jul. 11, 2014

(86) PCT No.: PCT/KR2014/006251
§ 371 (c)(1),
(2) Date: Nov. 6, 2015

(87) PCT Pub. No.: WO2015/005719
PCT Pub. Date: Jan. 15, 2015

(65) Prior Publication Data
US 2016/0115389 A1    Apr. 28, 2016

(30) Foreign Application Priority Data

Jul. 12, 2013 (KR) .................. 10-2013-0082474
Jul. 11, 2014 (KR) .................. 10-2014-0087367

(51) Int. Cl.
*G02F 1/13* (2006.01)
*C09K 19/54* (2006.01)
(Continued)

(52) U.S. Cl.
CPC ............ *C09K 19/54* (2013.01); *C09K 19/02* (2013.01); *C09K 19/10* (2013.01);
(Continued)

(58) Field of Classification Search
CPC ...................................... C09K 19/54
See application file for complete search history.

(56) References Cited

U.S. PATENT DOCUMENTS 5,130,057 A * 7/1992 Saxe ................. G02B 1/04
252/584
6,495,067 B1 * 12/2002 Ono ................. H01G 9/2009
136/263
(Continued)

FOREIGN PATENT DOCUMENTS

CN    101443434 A    5/2009
CN    102634349 A    8/2012
(Continued)

OTHER PUBLICATIONS

Axenov, K. V., & Laschat, S., "Thermotropic ionic liquid crystals," Materials (2011), 4, pp. 206-259; doi:10.3390/ma4010206.
(Continued)

*Primary Examiner* — Chanceity Robinson
(74) *Attorney, Agent, or Firm* — Rothwell, Figg, Ernst & Manbeck, P.C.

(57) ABSTRACT

Provided are a liquid crystal cell and a use thereof. An exemplary liquid crystal cell can be implemented in a bistable mode switching between a haze mode and a non-haze mode even with low driving voltage. Such a liquid crystal cell can be applied to various optical modulation apparatus, such as a smart window, a window protection film, a flexible display element, an active retarder for a 3D visual display, and a viewing angle-controlling film.

16 Claims, 4 Drawing Sheets

(a)

(b)

(51) Int. Cl.
*C09K 19/02* (2006.01)
*C09K 19/20* (2006.01)
*G02F 1/139* (2006.01)
*C09K 19/10* (2006.01)
*C09K 19/12* (2006.01)

(52) U.S. Cl.
CPC ........ *C09K 19/2007* (2013.01); *G02F 1/1391* (2013.01); *C09K 2019/122* (2013.01); *C09K 2019/2035* (2013.01)

(56) References Cited

U.S. PATENT DOCUMENTS

2006/0091538 A1    5/2006    Kabadi
2006/0188662 A1    8/2006    Farrand et al.

FOREIGN PATENT DOCUMENTS

| CN | 102959049 A | 3/2013 |
| CN | 103184053 A | 7/2013 |
| CN | 103429703 A | 12/2013 |
| EP | 0 107 492 A2 | 5/1984 |
| EP | 1 033 731 A2 | 9/2000 |
| EP | 2 799 516 A1 | 11/2014 |
| GB | WO 2012095627 A1 * | 7/2012 ............. C09K 19/02 |
| JP | H10-53585 A | 2/1998 |
| JP | 2006-514073 A | 4/2006 |
| JP | 2006128031 A * | 5/2006 |
| KR | 1020080023367 A | 3/2008 |
| KR | 1020130024870 A | 3/2013 |
| WO | 2012095627 A1 | 7/2012 |
| WO | 2013/097181 A1 | 7/2013 |

OTHER PUBLICATIONS

Sowmiah, S., et al., "On the chemical stabilities of ionic liquids," Molecules (2009), 14, pp. 3780-3813; doi: 10.3390/molecules14093780.

Yamanaka, N., et al., "Dye-sensitized TiO2 solar cells using imidazolium-type ionic liquid crystal systems as effective electrolytes," J. Phys. Chem. B (2007), 111, pp. 4763-4769.

International Search report in PCT/KR2014/006251 dated Oct. 27, 2014, 2 pages.

English translation of Written Opinion and Statement sheet in PCT/KR2014/006251 dated Oct. 27, 2014, 6 pages.

Office Action issued in corresponding Japanese Patent Application No. 2016-521228 dated Nov. 28, 2016, 3 pages.

Office Action issued in corresponding Chinese Patent Application No. 201480030145.4 dated Sep. 18, 2016, 6 pages.

* cited by examiner (a)  (b)

(a)  (b)

(a)　(b)

(a)　(b)

(a)  (b)

(a)  (b)

LIQUID CRYSTAL CELL

CROSS REFERENCE TO RELATED APPLICATIONS

This application is a 35 U.S.C. §371 National Phase Entry Application from PCT/KR2014/006251, filed Jul. 11, 2014, and designating the United States, which claims priority under 35 U.S.C. §119 to Korean Patent Application No. 10-2013-0082474 filed on Jul. 12, 2013, and Korean Patent Application No. 10-2014-0087367 filed on Jul. 11, 2014, which are incorporated herein by reference in their entireties.

TECHNICAL FIELD

The present application relates to a liquid crystal cell and a use thereof.

BACKGROUND ART

Liquid crystal modes may be classified into a monostable mode and bistable mode according to a state of stability. The monostable mode continuously requires external energy supply in order to maintain at least any one of the states of liquid crystal and the bistable mode requires external energy only when the state changes.

Patent Document 1 (U.S. Patent Publication No. 2006-0091538) discloses a bistable liquid crystal cell capable of being switched between a haze mode and a non-haze mode. The liquid crystal cell disclosed in Patent Document 1 uses a liquid crystal compound, and an ionic compound capable of inducing so-called electrohydrodynamic instability (EHDI), and can be switched between a haze mode and a non-haze mode by variable frequency. However, this type of liquid crystal cell requires very high driving voltage for being switched between a haze mode and a non-haze mode, and thus there is a practical limit in applying it to various display units. For this reason, recently, research on bistable liquid crystal cells capable of being switched between a haze mode and a non-haze mode, while having an excellent haze characteristic even with low driving voltage has been increasing in the field of display units.

DISCLOSURE

Technical Problem

The present application is directed to providing a liquid crystal cell and a use thereof.

Technical Solution

An exemplary liquid crystal cell may include two opposite substrates, and a liquid crystal layer. The liquid crystal layer may be provided between the two opposite substrates. In addition, the liquid crystal layer may include a liquid crystal compound and an ionic compound. The liquid crystal compound may be a liquid crystal compound exhibiting a smectic liquid crystal phase (hereinafter referred to as a "smectic liquid crystal compound"). In the present specification, the smectic liquid crystal phase may indicate that the liquid crystal phase is characterized in that a director of the liquid crystal compound is arranged in a predetermined direction, and also that the liquid crystal compounds are arranged while forming a layer or plane. The ionic compound may be an ionic compound capable of inducing so-called electrohydrodynamic instability (EHDI). Examples of the ionic compound may be an ionic compound having an anion having two or more iodine atoms. This liquid crystal cell may be implemented in a bistable mode capable of switching between a haze mode and a non-haze mode even with low driving voltage.

FIG. 1 illustrates an exemplary liquid crystal cell including two opposite substrates 101A, 101B, and a liquid crystal layer 102 having a liquid crystal compound 1021 and an ionic compound (not illustrated) provided between the two opposite substrates. As will be described below, the liquid crystal compounds may be included in the liquid crystal layer while arranged vertically as illustrated in (a) of FIG. 1, or may be included in the liquid crystal layer while arranged irregularly as illustrated in (b) of FIG. 1.

A liquid crystal compound may be selected and used without any particular limit as long as it can exhibit a smectic phase. The smectic liquid crystal compounds may be classified again into the smectic A phase to H phase liquid crystal compounds according to an arrangement way, and may be selected and used without any particular limit. Examples of the smectic liquid crystal compounds may include a liquid crystal compound capable of exhibiting a smectic A phase (hereinafter referred to as a "smectic A liquid crystal compound"). In the present specification, the smectic A phase may indicated a liquid crystal phase in which the directors of the arranged liquid crystal compounds among the smectic liquid crystal phases are vertical to a smectic layer or plane. As the smectic liquid crystal compounds, in addition to the smectic A liquid crystal compound, the above-described different kinds of smectic liquid crystal compounds may be used, and if necessary, may be used along with a suitable alignment layer as will be described below.

Examples of the smectic liquid crystal compound may include a liquid crystal compound represented by the following Chemical Formula 2.

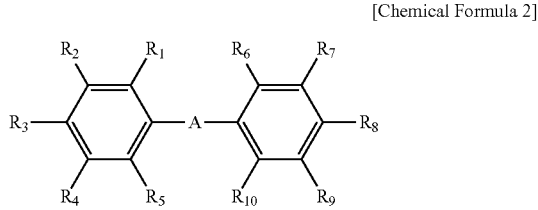

[Chemical Formula 2]

In Chemical Formula 2, A represents a single bond, —COO—, or —OCO—, and $R_1$ to $R_{10}$ each independently represent a hydrogen, a halogen, an alkyl group, an alkoxy group, an alkoxycarbonyl group, a cyano group, a nitro group, or a substituent represented by the following Chemical Formula 3.

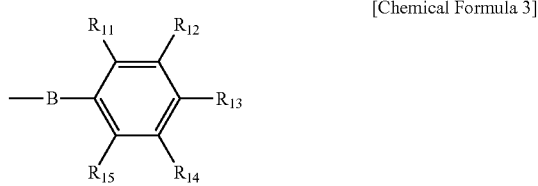

[Chemical Formula 3]

In Chemical Formula 3, B represents a single bond, —COO—, or —OCO—, and $R_{11}$ to $R_{15}$ each independently represent a hydrogen, a halogen, an alkyl group, an alkoxy group, an alkoxycarbonyl group, a cyano group, or a nitro group.

In Chemical Formula 3, the "-" on the left of B may mean that B is directly bound to benzene of Chemical Formula 1.

With respect to Chemical Formulas 2 and 3, the term "single bond" refers to the case in which no separate atom is in the portion represented by A or B. For example, in Chemical Formula 2, when A is a single bond, the benzenes at both sides of A may be directly bound to form a biphenyl structure.

In Chemical Formulas 2 and 3, examples of the halogen may include chlorine, bromine, or iodine.

In the present specification, unless otherwise specified, the term "alkyl group" may mean, for example, a linear or branched alkyl group having 1 to 20 carbon atoms, 1 to 16 carbon atoms, 1 to 12 carbon atoms, 1 to 8 carbon atoms, or 1 to 4 carbon atoms, or may mean, for example, a cycloalkyl group having 3 to 20 carbon atoms, 3 to 16 carbon atoms, or 4 to 12 carbon atoms. The alkyl group may be arbitrarily substituted with one or more substituents.

In the present specification, unless otherwise specified, the term "alkoxy group" may mean, for example, an alkoxy group having 1 to 20 carbon atoms, 1 to 16 carbon atoms, 1 to 12 carbon atoms, 1 to 8 carbon atoms, or 1 to 4 carbon atoms. The alkoxy group may be a linear, branched, or cyclic type. In addition, the alkoxy group may be arbitrarily substituted with one or more substituents.

In the present specification, examples of the substituents capable of being substituted at a specific functional group may include an alkyl group, an alkoxy group, an alkenyl group, an epoxy group, an oxo group, an oxetanyl group, a thiol group, a cyano group, a carboxyl group, an aryl group, or a substituent including silicon, but the present invention is not limited thereto.

In Chemical Formulas 2 and 3, any one of $R_1$ to $R_{15}$ may be an alkyl group, an alkoxy group, or an alkoxycarbonyl group having 5 or more carbon atoms, 6 or more carbon atoms, 7 or more carbon atoms, 8 or more carbon atoms, 9 or more carbon atoms, or 10 or more carbon atoms. The liquid crystal compounds may exhibit a smectic phase while arranged in the shape of a typical layer, for example, between a temperature lower than a temperature at which a nematic phase is exhibited and a solidifying temperature. Examples of the liquid crystal compounds may include 4-cyano-4'-heptylbiphenyl, 4-cyano-4'-heptyloxybiphenyl, 4-cyano-4'-octylbiphenyl, 4-cyano-4'-octyloxybiphenyl, 4-cyano-4'-nonylbiphenyl, 4-cyano-4'-nonyloxybiphenyl, 4-cyano-4'-decylbiphenyl, or 4-cyano-4'-decyloxybiphenyl, but the present invention is not limited thereto. As one specific example of the liquid crystal compound, HJA1512000-000 manufactured by HCCH may be used, but the present invention is not limited thereto.

The smectic liquid crystal compounds may be inter-converted between an irregular arrangement state, and a vertical arrangement state or a horizontal arrangement state. In the irregular arrangement state, the liquid crystal compounds may be irregularly arranged by the EHDI induced by the ionic compounds, and in the vertical or horizontal arrangement state, the liquid crystal compounds may be vertically or horizontally arranged while forming a layer in the liquid crystal layer according to the characteristics of the smectic liquid crystal compounds. In FIG. 1, (a) illustrates an exemplary vertical arrangement state of the liquid crystal compounds, and (b) illustrates an exemplary irregular arrangement state of the liquid crystal compounds.

In the present specification, the term "vertical arrangement" may refer to the case in which an optical axis of the liquid crystal compound has an angle of inclination of about 90° to 65°, about 90° to 75°, about 90° to 80°, about 90° to 85°, or about 90° to the plane of the liquid crystal layer, and the term "horizontal arrangement" may refer to the case in which an optical axis of the liquid crystal compound has an angle of inclination of about 0° to 25°, about 0° to 15°, about 0° to 10°, about 0° to 5°, or about 0° to the plane of the liquid crystal layer. In the present specification, the term "optical axis" may refer to the axis in the long-axis direction of the liquid crystal compound when the liquid crystal compound has a rod shape and the axis in the normal direction of the plane when the liquid crystal compound has a discotic shape.

The liquid crystal compounds may have positive dielectric constant anisotropy or negative dielectric constant anisotropy. In the present specification, the term "dielectric constant anisotropy" may mean the difference between extraordinary dielectric anisotropy ($\in_e$, dielectric constant in the long-axis direction) and ordinary dielectric anisotropy ($\in_o$, dielectric constant in the short-axis direction) of the liquid crystal compounds. As will be described below, a vertical electric field or a horizontal electric field may be properly applied for the arrangement according to the dielectric constant anisotropy of the liquid crystal compound. The dielectric constant anisotropy of the liquid crystal compound may be, for example, within the range of 3 to 20. When the dielectric constant anisotropy of the liquid crystal compounds is within the above range, for example, each of the modes of the liquid crystal cell may be switched even with low driving voltage.

The elastic modulus of the liquid crystal compound may be properly selected in consideration of desired physical properties, for example, the inter-conversion characteristics between an irregular arrangement state, and a vertical or horizontal arrangement state. In the present specification, the term "elastic modulus of the liquid crystal compound" may mean the value at which the intensity of the force required for restoring from the state in which the uniform molecule arrangement of the liquid crystal compounds is changed by external action such as voltage to the original state by elastic restoring force is quantified. As an example, the elastic modulus of the liquid crystal compound may be within the range of 5 to 30. When the elastic modulus of the liquid crystal compound is within the above range, for example, the bistable mode can be implemented stably through the interaction with the ionic compound.

The refractive index anisotropy of the liquid crystal compounds may be properly selected in consideration of desired physical properties, for example, haze or transmittance properties of the liquid crystal cell. In the present specification, the term "refractive index anisotropy" may mean the difference between an ordinary refractive index and an extraordinary refractive index of the liquid crystal compounds. As an example, the refractive index anisotropy of the liquid crystal compounds may be within the range of 0.1 to 0.25. The ordinary refractive index and extraordinary refractive index of the liquid crystal compounds may be properly selected as long as the difference therebetween is within the above range, and for example, the ordinary refractive index of the liquid crystal compounds may be within the range of 1.4 to 1.6 and the extraordinary refractive index thereof may be within the range of 1.5 to 1.8. When the refractive index anisotropy of the liquid crystal compounds is within the above range, for example, the liquid crystal cell capable of being switched between a haze mode having an excellent haze property and a non-haze mode can be implemented.

The ionic compound may be an ionic compound having an anion represented by the following Chemical Formula 1, for example.

$$I_n^-$$ [Chemical Formula 1]

In Chemical Formula 1, n may represent a number 2 or more. I refers to the element iodine. n may be properly selected from numbers 2 or more in consideration of the desired physical properties of the ionic compounds, for example, characteristics by which the irregular arrangement states of the smectic liquid crystal compounds can be induced. n may represent, for example, a number in the range of 2 to 30, 2 to 25, 2 to 20, 2 to 15, 3 to 10, 3 to 8, or 3 to 5. As a specific example, n may represent a number in the range of 3 to 5, but the present invention is not limited thereto. In the case of using such an ionic compound, for example, a bistable liquid crystal cell capable of witching between a haze mode having an excellent haze property even with low driving voltage and a non-haze mode can be implemented.

Examples of the ionic compound may include the compound in a salt type including a cation, and an anion represented by the above-described Chemical Formula 1. The cation can be used without any particular limit as long as it can form the compound in a salt type according to an electric characteristic along with the anion represented by the above-described Chemical Formula 1. Examples of the ionic compound may include a nitrogen-containing onium salt, a sulfur-containing onium salt, or a phosphorus-containing onium salt, but the present invention is not limited thereto.

Examples of the ionic compound may include a cation represented by any one of the following Chemical Formulas 4 to 7.

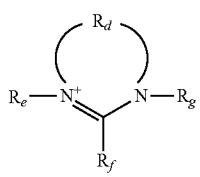

[Chemical Formula 4]

In Chemical Formula 4, $R_a$ represents a hydrocarbon group having 4 to 20 carbon atoms, and may include a heteroatom, and $R_b$ and $R_c$ each represent hydrogen, or a hydrocarbon group having 1 to 16 carbon atoms, and may include a heteroatom. However, when the nitrogen atom has a double bond, $R_c$ is not included.

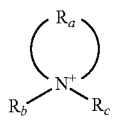

[Chemical Formula 5]

In Chemical Formula 5, $R_d$ represents a hydrocarbon group having 2 to 20 carbon atoms, and may include a heteroatom, and $R_e$, $R_f$, and $R_g$ each represent hydrogen, and a hydrocarbon group having 1 to 16 carbon atoms, and may include a heteroatom.

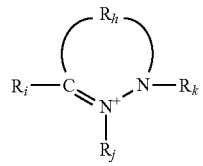

[Chemical Formula 6]

In Chemical Formula 6, $R_h$ represents a hydrocarbon group having 2 to 20 carbon atoms, and may include a heteroatom, and $R_i$, $R_j$, $R_k$ each represent hydrogen, and a hydrocarbon group having 1 to 16 carbon atoms, and may include a heteroatom.

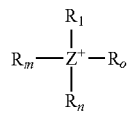

[Chemical Formula 7]

In Chemical Formula 7, Z represents a nitrogen, sulfur, or phosphorus atom, and $R_1$, $R_m$, $R_n$ and $R_o$ each represent a hydrocarbon group having 1 to 20 carbon atoms and may include a heteroatom. However, when Z is a sulfur atom, $R_o$ is not included.

Examples of the cation represented by Chemical Formula 4 may include a pyridinium cation, a piperidinium cation, a pyrrolidinium cation, a cation having a pyrroline frame, a cation having a pyrrole frame, and the like. Examples of these cations may include a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, a 1,1-dimethylpyrrolidinium cation, a 1-ethyl-1-methylpyrrolidinium cation, a 1-methyl-1-propylpyrrolidinium cation, a 2-methyl-1-pyrroline cation, a 1-ethyl-2-phenylindole cation, a 1,2-dimethylindole cation, a 1-ethylcarbazole cation, and the like, but the present invention is not limited thereto.

Examples of the cation represented by Chemical Formula 5 may include an imidazolium cation, a tetrahydropyrimidium cation, a dihydropyrimidium cation, and the like. Examples of these cations may include a 1,3-dimethylimidazolium cation, a 1,3-diethylimidazolium cation, a 1-ethyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, a 1,3-dimethyl-1,4,5,6-tetrahydropyrimidium cation, a 1,2,3-trimethyl-1,4,5,6-tetrahydropyrimidium cation, a 1,2,3,4-tetramethyl-1,4,5,6-tetrahydropyrimidium cation, a 1,2,3,5-tetramethyl-1,4,5,6-tetrahydropyrimidium cation, a 1,3-dimethyl-1,4-dihydropyrimidium cation, a 1,3-dimethyl-1,6-dihydropyrimidium cation, a 1,2,3-trimethyl-1,4-dihydropyrimidium cation, a 1,2,3-triethyl-1,6-dihydropyrimidium cation, a 1,2,3,4-tetramethyl-1,4-dihydropyrimidium cation, a 1,2,3,4-tetramethyl-1,6-dihydropyrimidium cation, and the like, but the present invention is not limited thereto.

Examples of the cation represented by Chemical Formula 6 may include a pyrazolium cation, a pyrazolinium cation, and the like. Examples of these cations may include a 1-methylpyrazolium cation, a 3-methylpyrazolium cation, a 1-ethyl-2-methylpyrazolinium cation, and the like, but the present invention is not limited thereto.

Examples of the cation represented by Chemical Formula 7 may include a tetraalkylammonium cation, a trialkylsulfonium cation, a tetraalkylphosphonium cation, or a cation in which some alkyl groups are substituted with an alkenyl group, an alkoxy group, or an epoxy group. Examples of these cations may include a tetramethylammonium cation, a tetraethylammonium cation, a tetrapropylammonium cation, a tetrabutylammonium cation, a tetrapentylammonium cation, a tetrahexylammonium cation, a tetraheptylammonium cation, a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylammonium cation, a triheptylhexylammonium cation, an N,N-diethyl-N-methyl-N-(2-methoxyethyl)ammonium cation, a glycidyltrimethylammonium cation, a diallyldimethylammonium cation, an N,N-dimethyl-N,N-dipropylammonium cation, an N,N-dimethyl-N,N-dihexylammonium cation, an N,N-dipropyl-N,N-dihexylammonium cation, an N,N-dimethyl-N-ethyl-N-propylammonium cation, an N,N-dimethyl-N-ethyl-N-butylammonium cation, an N,N-dimethyl-N-ethyl-N-pentylammonium cation, an N,N-dimethyl-N-ethyl-N-hexylammonium cation, an N,N-dimethyl-N-ethyl-N-heptylammonium cation, an N,N-dimethyl-N-propyl-N-butylammonium cation, an N,N-dimethyl-N-propyl-N-pentylammonium cation, an N,N-dimethyl-N-propyl-N-hexylammonium cation, an N,N-dimethyl-N-propyl-N-heptylammonium cation, an N,N-dimethyl-N-butyl-N-hexylammonium cation, an N,N-dimethyl-N-butyl-N-heptylammonium cation, an N,N-dimethyl-N-pentyl-N-hexylammonium cation, an N,N-dimethyl-N-hexyl-N-heptylammonium cation, a trimethylheptylammonium cation, an N,N-diethyl-N-methyl-N-propylammonium cation, an N,N-diethyl-N-methyl-N-pentylammonium cation, an N,N-diethyl-N-methyl-N-heptylammonium cation, an N,N-diethyl-N-propyl-N-pentylammonium cation, a triethylmethylammonium cation, a triethylpropylammonium cation, a triethylpentylammonium cation, a triethylheptylammonium cation, an N,N-dipropyl-N-methyl-N-ethylammonium cation, an N,N-dipropyl-N-methyl-N-pentylammonium cation, an N,N-dipropyl-N-butyl-N-hexylammonium cation, an N,N-dibutyl-N-methyl-N-pentylammonium cation, an N,N-dibutyl-N-methyl-N-hexylammonium cation, a trioctylmethylammonium cation, an N-methyl-N-ethyl-N-propyl-N-pentylammonium cation, a trimethylsulfonium cation, a triethylsulfonium cation, a tributylsulfonium cation, a trihexylsulfonium cation, a diethylmethylsulfonium cation, a dibutylethylsulfonium cation, a dimethyldecylsulfonium cation, a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a triethylmethylphosphonium cation, a tributylethylphosphonium cation, a trimethyldecylphosphonium cation, and the like, but the present invention is not limited thereto.

In detail, as the tetraalkylammonium cation, such as, a triethylmethylammonium cation, a tributylethylammonium cation, a trimethyldecylammonium cation, a trioctylmethylammonium cation, a tripentylbutylammonium cation, a trihexylmethylammonium cation, a trihexylpentylammonium cation, a triheptylmethylammonium cation, a triheptylhexylammonium cation, an N,N-diethyl-N-methyl-N-(2-methoxyethyl)ammonium cation, a glycidyltrimethylammonium cation, an N,N-dimethyl-N-ethyl-N-propylammonium cation, an N,N-dimethyl-N-ethyl-N-butylammonium cation, an N,N-dimethyl-N-ethyl-N-pentylammonium cation, an N,N-dimethyl-N-ethyl-N-hexylammonium cation, an N,N-dimethyl-N-ethyl-N-heptylammonium cation, an N,N-dimethyl-N-ethyl-N-nonylammonium cation, an N,N-dimethyl-N-propyl-N-butylammonium cation, an N,N-dimethyl-N-propyl-N-pentylammonium cation, an N,N-dimethyl-N-propyl-N-hexylammonium cation, an N,N-dimethyl-N-propyl-N-heptylammonium cation, an N,N-dimethyl-N-butyl-N-hexylammonium cation, an N,N-dimethyl-N-butyl-N-heptylammonium cation, an N,N-dimethyl-N-pentyl-N-hexylammonium cation, an N,N-dimethyl-N-hexyl-N-heptylammonium cation, an N,N-dimethyl-N,N-dihexylammonium cation, a trimethylheptylammonium cation, an N,N-diethyl-N-methyl-N-propylammonium cation, an N,N-diethyl-N-methyl-N-pentylammonium cation, an N,N-diethyl-N-methyl-N-heptyl cation, an N,N-diethyl-N-propyl-N-pentylammonium cation, a triethylpropylammonium cation, a triethylpentylammonium cation, a triethylheptylammonium cation, an N,N-dipropyl-N-methyl-N-ethylammonium cation, an N,N-dipropyl-N-methyl-N-pentylammonium cation, an N,N-dipropyl-N-butyl-N-hexylammonium cation, an N,N-dipropyl-N,N-dihexylammonium cation, an N,N-dibutyl-N-methyl-N-pentylammonium cation, an N,N-dibutyl-N-methyl-N-hexylammonium cation, and an N-methyl-N-ethyl-N-propyl-N-pentylammonium cation, a trialkylsulfonium cation, such as a trimethylsulfonium cation, a triethylsulfonium cation, a tributylsulfonium cation, a trihexylsulfonium cation, a diethylmethylsulfonium cation, a dibutylethylsulfonium cation, and a dimethyldecylsulfonium cation, a tetraalkylphosphonium cation, such as, a tetramethylphosphonium cation, a tetraethylphosphonium cation, a tetrabutylphosphonium cation, a tetrapentylphosphonium cation, a tetrahexylphosphonium cation, a tetraheptylphosphonium cation, a tetraoctylphosphonium cation, a triethylmethylphosphonium cation, a tributylethylphosphonium cation, and a trimethyldecylphosphonium cation, and the like may be selected and then used, but the present invention is not limited thereto.

The ratio of the ionic compounds in the liquid crystal layer may be properly selected in consideration of desired physical properties, for example, characteristics capable an irregular arrangement state of the smectic liquid crystal compounds can be induced. The ionic compounds may be included in the liquid crystal layer, for example, in the ratio of 0.005 wt % or more, 0.006 wt % or more, 0.007 wt % or more, 0.008 wt % or more, 0.009 wt % or more, 0.01 wt % or more, 0.02 wt % or more, 0.04 wt % or more, 0.06 wt % or more, 0.08 wt % or more, 0.10 wt % or more, 0.12 wt % or more, 0.14 wt % or more, 0.16 wt % or more, 0.18 wt % or more, 0.20 wt % or more, 0.22 wt % or more, or 0.24 wt % or more. The upper limit of the ratio of the ionic compound in the liquid crystal layer may be, for example, 0.5 wt % or less, 0.48 wt % or less, 0.46 wt % or less, 0.44 wt % or less, 0.42 wt % or less, 0.40 wt % or less, 0.38 wt % or less, 0.36 wt % or less, 0.34 wt % or less, 0.32 wt % or less, 0.30 wt % or less, 0.28 wt % or less, or 0.26 wt % or less. When the ratio of the ionic compound in the liquid crystal layer is within the above-described range, for example, a bistable liquid crystal cell capable of switching between a haze mode which has an excellent haze characteristic even with low driving voltage and a transmission mode can be implemented.

A liquid crystal cell can switch between a haze mode and a non-haze mode through the supply of external force such as voltage and by controlling the arrangement state of the liquid crystal compounds. For example, when the liquid crystal compounds are irregularly arranged, the liquid crystal cell may exhibit a haze mode and when the liquid crystal compounds are provided in an arrangement state, the liquid crystal cell may exhibit a non-haze mode. In the present specification, the term "haze mode" may mean the mode in which the liquid crystal cell exhibits the haze to a predetermined certain level or more, and the term "non-haze mode" may mean a light-transmissible state or the mode in which the liquid crystal cell exhibits the haze to a predetermined certain level or less.

For example, the liquid crystal cell in the haze mode may have the haze of 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more. The liquid crystal cell in the non-haze mode may have, for example, the haze of 10% or less, 8% or less, 6% or less, or 5% or less. The haze may be a percentage of a transmittance of diffused light to the transmittance of the total transmitted light transmitted through the object to be measured. The haze may be estimated using a hazemeter (NDH-5000SP). The haze may be estimated in the following way using the hazemeter. In other words, the incidence of light within an integrating sphere is performed by transmitting the light through an object to be measured. In this process, the light is isolated into diffused light (DT) and parallel light (PT) by the object to be measured. This light is reflected in an integrating sphere and concentrated on a light receiving element. It is possible to measure the haze through the concentrated light. In other words, the total transmitted light (TT) of the above-described process is the total amount (DT+PT) of the diffused light (DT) and parallel light (PT), and the haze may be defined as a percentage of the diffused light to the total transmitted light (Haze (%)=100×DT/TT).

The liquid crystal cell can switch between the haze mode and the non-haze mode when, for example, an electric field of a proper frequency is applied. For example, the electric field frequency required for switching from the non-haze mode to the haze mode may be low frequency in the range of 1 to 500 Hz and the electric field frequency required for switching from the haze mode to the non-haze mode may be high frequency of 1 kHz or more. The range of the electric field frequency required for switching between the modes of the liquid crystal cell is not limited to the above-described range, and may be properly changed in consideration of desired physical properties, for example, the haze or transmittance characteristics of the respective modes.

It is possible to switch the liquid crystal cell between the haze mode and the non-haze mode even with low driving voltage. For example, for the liquid crystal cell, the voltage required for switching between the haze mode having the haze of 80% or more and the non-haze mode having the haze of 10% or less may be 120 V or less, 118 V or less, 116 V or less, 114 V or less, 112 V or less, 110 V or less, 108 V or less, 106 V or less, 104 V or less, 102 V or less, 100 V or less, 98 V or less, 96 V or less, 94 V or less, 92 V or less, 90 V or less, 88 V or less, 86 V or less, 84 V or less, 82 V or less, or 80 V or less. The liquid crystal cell can be switched between the haze mode and the non-haze mode even with such low driving voltage by using the ionic compound having the anion represented by the above-described Chemical Formula 1 as an ionic compound, for example.

The liquid crystal cell may have the transmittance variable characteristics. The degree of the transmittance variable characteristics of the liquid crystal cell is not particularly limited, but for example, the liquid crystal cell may be implemented so as to switch between two modes within the range of the transmittance difference of about 2 to 3%, but the present invention is not limited thereto. As an example, the liquid crystal cell may be implemented so as to switch between a transmission mode having the transmittance of 85% or more and a white mode having the transmittance of 83% or less. When the liquid crystal cell is implemented so as to switch between the transmission mode and the white mode, the liquid crystal compounds may be in an arrangement state in the transmission mode and in an irregular arrangement state in the white mode. These transmittance variable characteristics can be achieved by controlling the arrangement state of the liquid crystal compounds through application of the electric field of a proper frequency to the liquid crystal cell, for example.

The liquid crystal cell may further include an anisotropic dye in the liquid crystal layer. Examples of the anisotropic dye can improve the transmittance variable characteristic of the liquid crystal cell. In the present specification, the term "dye" may mean a substance capable of intensively absorbing and/or modifying at least a part or all of a light range in the wavelength range of visible rays, for example, 400 nm to 700 nm, and the term "anisotropic dye" may mean a substance capable of anisotropically absorbing light in at least part or all of the range of visible rays.

As the anisotropic dye, for example, known dyes that are known to have the characteristic of being arrangeable according to the arrangement state of the liquid crystal compounds may be selected and used. As the anisotropic dye, for example, a black dye may be used. As these dyes, for example, an azo dye or anthraquinone dye is known, but the present invention is not limited thereto.

As an anisotropic dye, dyes in which a dichroic ratio, that is, the value obtained by dividing the absorption of polarized light parallel to the long-axis direction of the anisotropic dye by the absorption of polarized light parallel to the direction vertical to the long-axis direction, is 5 or more, 6 or more, or 7 or more may be used. The dyes can satisfy the above-described dichroic ratio at at least some wavelengths or any one wavelength in the wavelength range of visible rays, for example, about 380 nm to 700 nm or about 400 nm to 700 nm. The upper limit of the dichroic ratio may be, for example, about 20 or less, 18 or less, 16 or less, or 14 or less.

The ratio of the anisotropic dye in the liquid crystal layer may be properly selected according to the desired physical properties, for example, the desired transmittance variable characteristics of the liquid crystal cell. For example, the anisotropic dye may be included in the ratio of 0.01 wt % or more, 0.1 wt % or more, 0.2 wt % or more, 0.3 wt % or more, 0.4 wt % or more, 0.5 wt % or more, 0.6 wt % or more, 0.7 wt % or more, 0.8 wt % or more, 0.9 wt % or more, or 1.0 wt % or more in the liquid crystal layer. The upper limit of the ratio of the anisotropic dye in the liquid crystal layer may be, for example, 2 wt % or less, 1.9 wt % or less, 1.8 wt % or less, 1.7 wt % or less, 1.6 wt % or less, 1.5 wt % or less, 1.4 wt % or less, 1.3 wt % or less, 1.2 wt % or less, or 1.1 wt % or less. When the ratio of the anisotropic dye in the liquid crystal layer is within the above-described range, for example, as compared with the case without the anisotropic dye, the transmittance variable characteristics of the liquid crystal cell may be improved by about 10% or more.

As described above, the liquid crystal cell may exhibit an excellent transmittance variable characteristic when an anisotropic dye is included. For example, the liquid crystal cell may be implemented, so that the liquid crystal cell can switch between a transmittance mode having the transmittance of 50% or more, 55% or more, 60% or more, 65% or more, 70% or more, 75% or more, 80% or more, 85% or more, 90% or more, or 95% or more and a black mode having the transmittance of 40% or less, 35% or less, 30% or less, 25% or less, 20% or less, 15% or less, 10% or less, or 5% or less. When the liquid crystal cell is implemented so that it can switch between the transmittance mode and the black mode, the liquid crystal compounds may be in the arrangement state in the transmittance mode and may be in the irregular arrangement state in the black mode. These excellent transmittance variable characteristics can be achieved, for example, by further adding an anisotropic dye to the liquid crystal cell and controlling the arrangement state of the liquid crystal compound through application of an electric field of a proper frequency. In addition, the transmittance range may be controlled by properly selecting the ratio of an anisotropic dye in the liquid crystal layer, or the absorption wavelength or absorption coefficient of the anisotropic dye.

The liquid crystal cell may further have a polymer network in the liquid crystal layer. For example, the polymer network may be further included in order to control a haze or transmittance characteristic of the liquid crystal cell. In addition, the polymer network may be existed in the state of the phase being isolated from the liquid crystal compound. For example, as illustrated in FIG. 2, the polymer network 201 may be included in the liquid crystal layer 102 in the structure having the polymer network 201 distributed in the continuous phase liquid crystal compounds 1021, which is known as a Polymer Network Liquid Crystal (PNLC) structure, or as illustrated in FIG. 3, the polymer network 301 may be included in the liquid crystal layer 102 in the structure having the liquid crystal area 302 including the liquid crystal compounds 1021 dispersed in the polymer network 301, which is known as a Polymer Dispersed Liquid Crystal (PDLC) structure.

A polymer network may be, for example, a network of the precursors including polymeric compounds. Therefore, the polymer network may include the polymeric compounds in the polymerized state. As the polymeric compounds, non-liquid crystal compounds that do not exhibit a liquid crystal property may be used. As the polymeric compounds, compounds having one or more polymeric functional groups that are known to be able to form a polymer network of a so-called PDLC or PNLC element or if necessary, non-polymeric compounds without polymeric functional groups may be used. Examples of the polymeric compounds that may be included in the precursors may include acryl ate compounds, but the present invention is not limited thereto.

The ratio of the polymer network in the liquid crystal cell may be properly selected in consideration of the desired physical properties, for example, a haze or transmittance characteristic of the liquid crystal cell. The polymer network may be included in the liquid crystal layer in the ratio of 40 wt % or less, 38 wt % or less, 36 wt % or less, 34 wt % or less, 32 wt % or less, or 30 wt % or less, for example. The lower limit of the ratio of the polymer network in the liquid crystal layer may be, but is not limited to, for example, 0.1 wt % or more, 1 wt %, 2 wt % or more, 3 wt % or more, 4 wt % or more, 5 wt % or more, 6 wt % or more, 7 wt % or more, 8 wt % or more, 9 wt % or more, or 10 wt % or more.

A liquid crystal cell may include two opposite substrates, and a liquid crystal layer may be provided between the two opposite substrates. As the substrates, materials that are known may be used without any particular limit. Examples thereof may include an inorganic film, such as a glass film, a crystalline or amorphous silicon film, quartz, or an Indium Tin Oxide (ITO) film, or a plastic film. As the substrates, an optically isotropic substrate, an optically anisotropic substrate such as a phase contrast layer, a polarizing plate, or a color filter substrate may be used.

Examples of the plastic substrate may include substrates including triacetyl cellulose (TAC); a cyclo olefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); Polyacrylate (Pac); poly ether sulfone (PES); polyetheretherketone (PEEK); polyphenylsulfone (PPS), polyetherimide (PEI); polyethylenenaphthalate (PEN); polyethyleneterephthalate (PET); polyimide (PI); polysulfone (PSF); a polyarylate (PAR) or an amorphous fluorine resin, but the present invention is not limited thereto. The substrate may include, if necessary, a coating layer of gold, silver, or a silicon compound, such as silicon dioxide or silicon monoxide, or a coating layer such as an anti-reflection layer.

A liquid crystal cell may further include an alignment layer. The alignment layer may be arranged adjacent to the liquid crystal layer. As illustrated in FIGS. 6 and 7, for example, the alignment layer may be provided on the side of the liquid crystal layer 102 of two opposite substrates 101A, 101B (illustrated as 601A, 601B, 701A, and 702B). In the present specification, the alignment layer is arranged adjacent to the liquid crystal layer, meaning that the alignment layer is arranged to have an effect on the arrangement of the liquid crystal compounds in the liquid crystal layer.

A type of alignment layer may be properly selected according to a type of smectic liquid crystal compound included in the liquid crystal layer. As an example, when the smectic liquid crystal compound included in the liquid crystal layer is a smectic A liquid crystal compound, the alignment layer is not necessary for driving a liquid crystal device, but may be further used in order to control the arrangement state of the liquid crystal compounds. Such an alignment layer may be, for example, a vertical or horizontal alignment layer. The vertical or horizontal alignment layer may be selected and used without any particular limit as long as it has vertical or horizontal alignment ability to the liquid crystal compounds of the liquid crystal layer adjacent thereto. Examples of the alignment layer may include an alignment layer that is known to exhibit an alignment property through a non-contact method, such as irradiation of plane polarization, including a photoalignment layer or a contact alignment layer compound, for example, a rubbing alignment layer.

A liquid crystal cell may further include an electrode layer. The electrode layer may be arranged adjacent to a liquid crystal layer. For example, as illustrated in FIGS. 4 and 5, the electrode layer may be provided on the side of the liquid crystal layer 102 of two opposite substrates 101A, 101B (illustrated as 401A, 401B, 501A, and 501B). Such an electrode layer may apply a vertical or horizontal electric field to the liquid crystal layer so that the arrangement state of the liquid crystal compounds in the liquid crystal layer can be converted. The electrode layer may be formed by depositing, for example, metallic oxides, such as a conductive polymer, a conductive metal, conductive nanowires or ITO (Indium Tin Oxide). The electrode layer may be formed to be transparent. Various materials and formation methods for forming a transparent electrode layer are known in this field, and all these methods can be applied. If necessary, the electrode layer formed on the surface of the substrate may be properly patterned.

A liquid crystal cell may be operated in a bistable mode. For example, the liquid crystal cell may switch between a haze mode and a non-haze mode, and even at the time of switching between these modes, the supply of external energy such as voltage is required. This liquid crystal cell can switch between a haze mode and a non-haze mode according to the arrangement state of the liquid crystal compounds, and the external energy, such as, voltage is required at the time of changing the arrangement states of the liquid crystal compounds.

FIG. 1 illustrates an exemplary bistable liquid crystal cell. As illustrated in FIG. 1, the exemplary liquid crystal cell can be implemented in a non-haze mode a while the smectic liquid crystal compounds 1021 in the liquid crystal layer 102 have a degree of interlayer arrangement and are arranged in the direction in which the long-axis of the each of the layers is vertical to the layer side, and these liquid crystal compounds can be converted to a haze mode b while in an irregular arrangement state due to EHDI induced by the ionic compound (not illustrated). The conversion into the haze mode may be performed by applying a low frequency electric field, and after the conversion, even if the electric field is removed, the state of the haze mode can be maintained. In addition, when a high frequency electric field is applied to the liquid crystal cell in such a haze mode, it may be converted into a non-haze mode, and then, after the conversion, even if the electric field is removed, the state of the non-haze mode can be maintained.

This liquid crystal cell may be operated in various ways. FIGS. 4 to 7 illustrate an exemplary way of driving the liquid crystal cell using the smectic liquid crystal compounds having positive dielectric constant anisotropy (ionic compounds are not illustrated). FIG. 4 illustrates an exemplary way of driving the liquid crystal cell, which switches between a vertical arrangement state a and an irregular arrangement state b by the electric layers 401A, 401B, such that a vertical electric field is applied to the side of the liquid crystal layer 102 of two opposite substrates 101A, 101B. FIG. 5 illustrates an exemplary way of driving the liquid crystal cell, which switches between a horizontal arrangement state a and an irregular arrangement state b by the electric layers 501A, 501B, such that a horizontal electric field is applied to the side of the liquid crystal layer 102 of two opposite substrates 101A, 101B. The exemplary liquid crystal compounds illustrated in FIGS. 4 and 5 can be converted into the irregular arrangement state from the vertical or horizontal arrangement state by applying the electric field of low frequency, and can be converted into the vertical or horizontal arrangement state from the irregular arrangement state by applying the electric field of high frequency. When the liquid crystal compounds exhibit negative dielectric constant anisotropy, as illustrated in FIG. 4, the horizontal electric field may be applied for the vertical arrangement, and as illustrated in FIG. 5, the vertical electric field may be applied for the horizontal arrangement.

As described above, the liquid crystal cell may further include an alignment layer on the side of the liquid crystal layer of two opposite substrates in order to control the arrangement state of the liquid crystal compounds. FIG. 6 illustrates an exemplary way of driving the liquid crystal cell, in which the liquid crystal cell of FIG. 4 further includes the alignment layers 601A, 601B, and FIG. 7 illustrates an exemplary way of driving the liquid crystal cell, in which the liquid crystal cell of FIG. 5 further includes the alignment layers 701A, 701B.

In addition, the present application relates to a use of a liquid crystal cell. An exemplary liquid crystal cell can be implemented in a bistable mode switching between a haze mode and a non-haze mode even with low driving voltage. This liquid crystal cell can be useful in an optical modulation apparatus. Examples of the optical modulation apparatus may include a smart window, a window protection film, a flexible display element, an active retarder for a 3D visual display, a viewing angle-controlling film, and the like, but the present invention is not limited thereto. As the method of constituting the optical modulation apparatus as described above, a general method can be applied without any particular limit, as long as the above-described liquid crystal cell is used.

Advantageous Effects

An exemplary liquid crystal cell can be implemented in a bistable mode switching between a haze mode and a non-haze mode even with low driving voltage. Such a liquid crystal cell can be applied to various optical modulation apparatus, such as a smart window, a window protection film, a flexible display element, an active retarder for a 3D visual display, and a viewing-angle-controlling film.

MODES OF THE INVENTION

Hereinafter, the above contents will be described in more detail with reference to Examples and Comparative Example. However, the present application is not limited to the exemplary embodiments disclosed below.

1. Measurements of Transmittance and Haze

The transmittances and hazes of the liquid crystal cells manufactured in Examples and Comparative Examples were measured according to ASTM standards using a hazemeter, NDH-5000SP.

EXAMPLE 1

A liquid crystal cell was manufactured by arranging two polycarbonate (PC) films on which an Indium Tin Oxide (ITO) transparent electrode layer and a known vertical alignment layer forms sequentially apart from each other so that the alignment layers were opposite each other and the distance therebetween was to be about 9 μm; injecting a liquid crystal composition between the two PC films arranged apart from each other; and then sealing an edge. The liquid crystal composition was prepared by mixing the liquid crystal compound (HJA151200-000 manufactured by HCCH) exhibiting a smectic A phase, an anisotropic dye (X12 manufactured by BASF), and an ionic compound including the cation represented by the following Chemical Formula A and the anion represented by the following Chemical Formula B in the weight ratio of 99.2:0.7:0.1 (Liquid crystal compound:Anisotropic dye:Ionic compound), and then used. For the prepared liquid crystal cell, the transmittance and haze were about 62.39% and about 1.36%, respectively, when no voltage was supplied (this state may be referred to hereinafter as a non-haze mode).

[Chemical Formula A]

$I_3^-$   [Chemical Formula B]

EXAMPLE 2

A liquid crystal cell was manufactured in the same method as Example 1, except that a PC film without the alignment layers on the surfaces of the electrode layers was used. For the prepared liquid crystal cell, the transmittance and haze were about 36.31% and about 90.28%, respectively, when no voltage was supplied (this state may be referred to hereinafter as the non-haze mode).

COMPARATIVE EXAMPLE 1

A liquid crystal cell was manufactured in the same method as Example 2, except that a compound including the cation represented by the above-described Chemical Formula A and the anion represented by the following Chemical Formula C were used as an ionic compound. For the prepared liquid crystal cell, the transmittance and haze were about 35.80% and about 88.28%, respectively, when no voltage was supplied (this state may be referred to hereinafter as the non-haze mode).

$Br^-$   [Chemical Formula C]

TEST EXAMPLE 1

Evaluation of Driving Voltage

Figure 1:
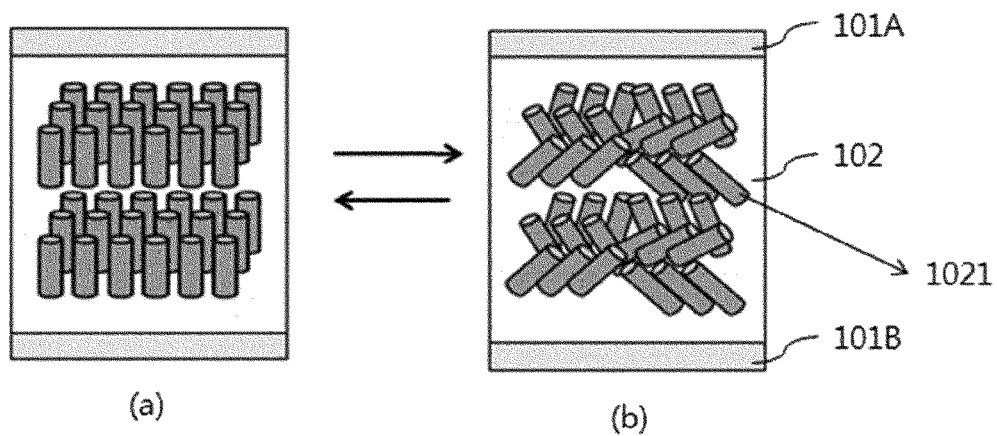
FIGS. 1(a) and (b), 2(a) and (b), and 3(a) and (b) illustrate the exemplary liquid crystal cells.
Figure 2:
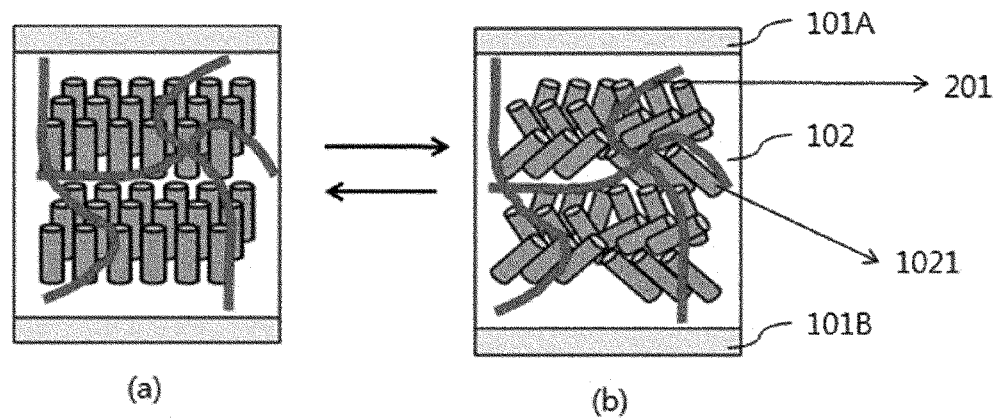
Figure 3:
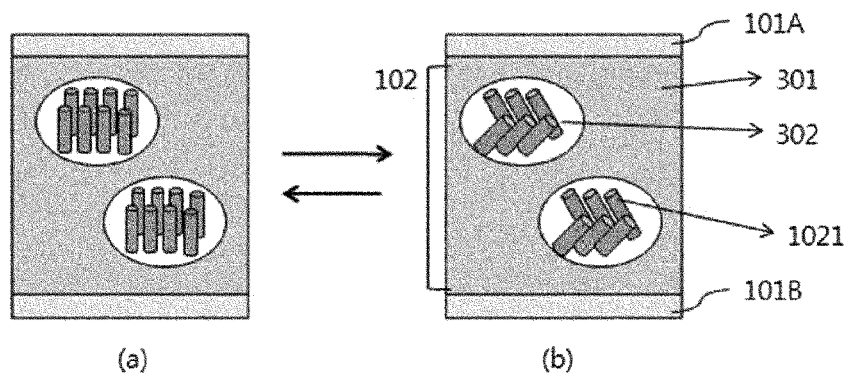
Figure 4:
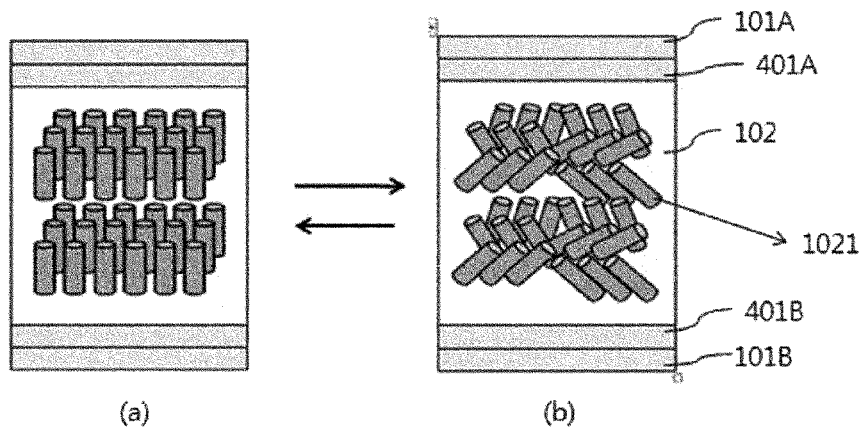
FIGS. 4(a) and (b), 5(a) and (b), 6(a) and (b), and 7 illustrate the exemplary ways of driving the liquid crystal cell.
Figure 5:
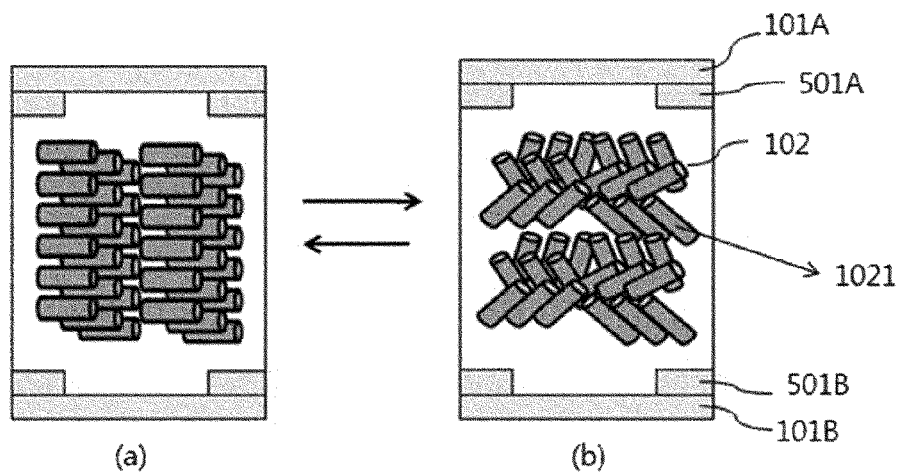
Figure 6:
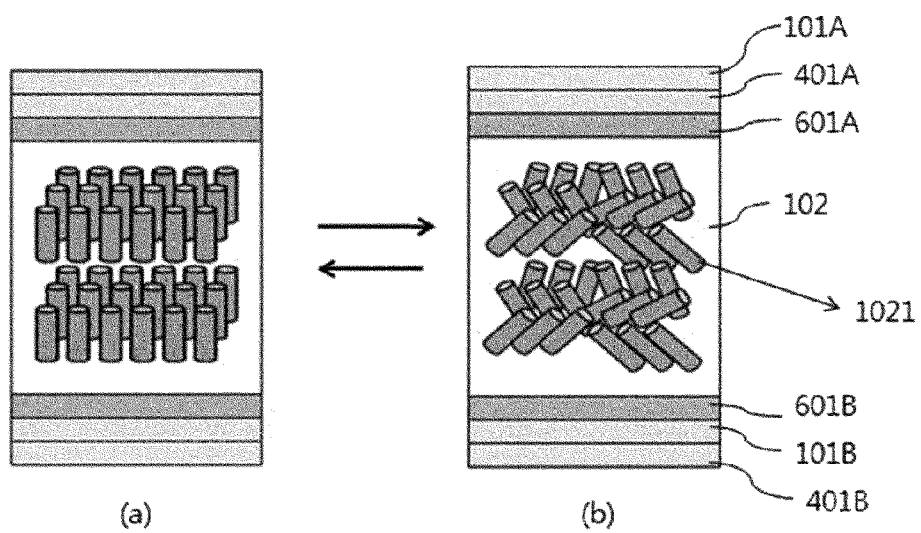
Figure 7:
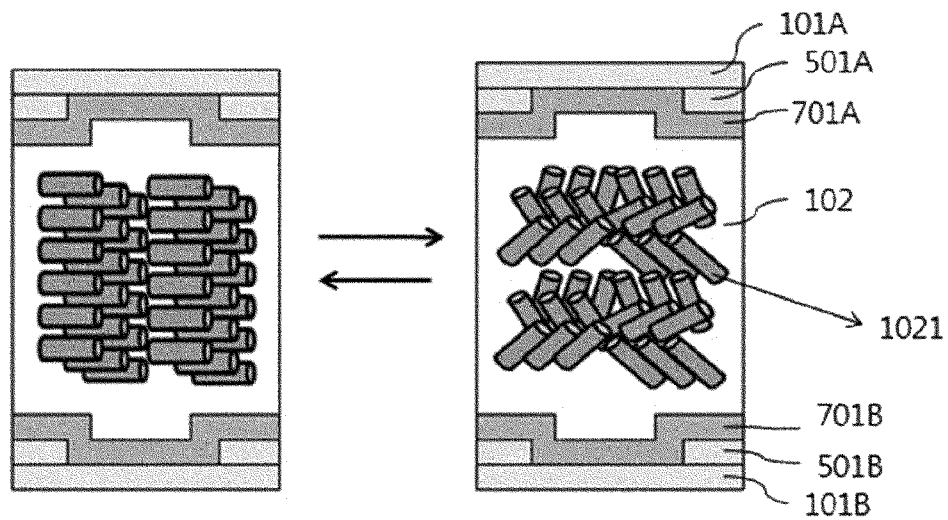
Figure 8:
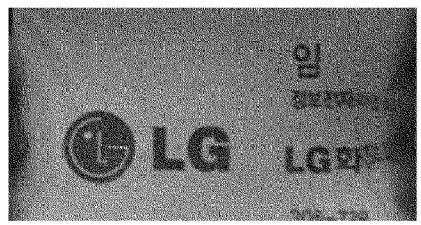
FIG. 8 illustrates the state of the liquid crystal cell in a non-haze mode according to Example 1.
Figure 9:
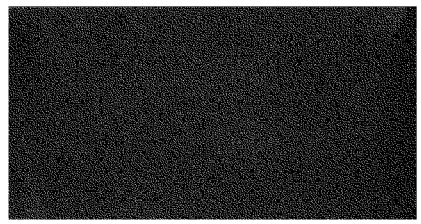
FIG. 9 illustrates the state of the liquid crystal cell in a haze mode according to Example 1.

The voltage required for switching was evaluated after electrical power was connected to the ITO transparent electrode layer in each of the liquid crystal cells prepared in Examples and Comparative Example, the modes were switched during supply of a driving voltage. In other words, in the non-haze mode of Example 1, the voltage required for switching the non-haze mode into the haze mode having the transmittance of 40% or less and the haze of 90% or more was measured; and in the haze mode of Comparative Example 1 or Example 2, the voltage required for switching the haze mode into the non-haze mode having the transmittance of 60% or more and the haze of 2% or less was measured. FIG. 8 illustrates the state of the liquid crystal cell in the non-haze mode according to Example 1, and FIG. 9 illustrates the state of the liquid crystal cell in the haze mode according to Example 1.

As listed in the following Table 1, in the liquid crystal cell according to Example 1, a voltage of 80 V at a frequency of 60 Hz was required to convert the non-haze mode into the haze mode having the transmittance of about 37.37% and the haze of about 92.37%, and even when the external voltage was removed after converting the non-haze mode into the haze mode, the haze mode was stably maintained for about 240 hours or more. In addition, a voltage of 80 V at a frequency of 6 kHz was required to convert the haze mode into the original non-haze mode. In addition, in the liquid crystal cell according to Example 2, a voltage of 80 V at a frequency of 6 kHz was required to convert the haze mode into the non-haze mode having the transmittance of about 62.54% and the haze of about 1.39%, and even when the external voltage was removed after converting the haze mode into the non-haze mode, the non-haze mode was stably maintained for about 240 hours or more. In addition, a voltage of 80 V at a frequency of 60 Hz was required to convert the non-haze mode into the original haze mode. On the other hand, in the case of Comparative Example 1, a high driving voltage of about 120 V at the same frequency was required to convert between the similar haze mode and non-haze mode.

TABLE 1

|  | Vertical electric field 80 V [60 Hz] applied | | Vertical electric field 80 V [6 kHz] applied | |
| --- | --- | --- | --- | --- |
| Example 1 | Transmittance | 37.37% | Transmittance | 62.39% |
|  | Haze | 92.37% | Haze | 1.36% |
| Example 2 | Transmittance | 36.31% | Transmittance | 62.54% |
|  | Haze | 90.28% | Haze | 1.39% |

|  | Vertical electric field 120 V [60 Hz] applied | | Vertical electric field 120 V [6 kHz] applied | |
| --- | --- | --- | --- | --- |
| Comparative | Transmittance | 35.80% | Transmittance | 63.04% |
| Example 1 | Haze | 88.23% | Haze | 1.9% |

EXPLANATION OF REFERENCE NUMBERS

101A, 101B: Substrate
102: Liquid crystal layer
1021: Smectic liquid crystal compound
201, 301: Polymer network
302: Liquid crystal area
401A, 401B, 501A, 501B: Electrode layer
601A, 601B, 701A, 701B: Alignment layer

The invention claimed is:

1. A bistable liquid crystal cell comprising:
two opposite substrates; and
a liquid crystal layer provided between the two opposite substrates and including a smectic liquid crystal compound, and an ionic compound having an anion represented by the following Chemical Formula 1:

$I_n^-$   [Chemical Formula 1]

where, in Chemical Formula 1, I represents iodine and n represents a number of 2 or more,
wherein the bistable liquid crystal cell is capable of switching between a haze mode having a haze of 80% or more and a non-haze mode having a haze of 10% or less at a voltage of 80 V or less, and
wherein a ratio of the ionic compound in the liquid crystal layer is within the range of 0.005 wt % to 5.0 wt %.

2. The bistable liquid crystal cell of claim 1, wherein the smectic liquid crystal compound is a smectic A liquid crystal compound.

3. The bistable liquid crystal cell of claim 1, wherein the smectic liquid crystal compound is a compound represented by the following Chemical Formula 2:

[Chemical Formula 2]

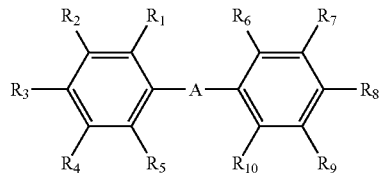

where, in Chemical Formula 2, A represents a single bond, —COO—, or —OCO—, and $R_1$ to $R_{10}$ each independently represent a hydrogen, a halogen, an alkyl group, an alkoxy group, an alkoxycarbonyl group, a cyano group, a nitro group, or a substituent represented by the following Chemical Formula 3, wherein, in Chemical Formulas 2 and 3, any one of $R_1$ to $R_{15}$ is an alkyl group, an alkoxy group, or an alkoxycarbonyl group having 5 or more carbon atoms,

[Chemical Formula 3]

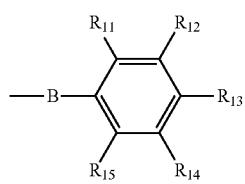

where, in Chemical Formula 3, B represents a single bond, —COO—, or —OCO—, and $R_{11}$ to $R_{15}$ each independently represent a hydrogen, a halogen, an alkyl group, an alkoxy group, an alkoxycarbonyl group, a cyano group, or a nitro group.

4. The bistable liquid crystal cell of claim 1, wherein, in Chemical Formula 1, n represents a number within the range of 3 to 10.

5. The bistable liquid crystal cell of claim 1, wherein the ionic compound is a nitrogen-containing onium salt, a sulfur-containing onium salt, or a phosphorus-containing onium salt.

6. The bistable liquid crystal cell of claim 1, wherein the ionic compound includes a cation represented by any one of the following Chemical Formulas 4 to 7:

[Chemical Formula 4]

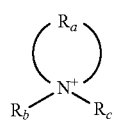

where, in Chemical Formula 4, $R_a$ represents a hydrocarbon group having 4 to 20 carbon atoms, and includes a heteroatom, and $R_b$ and $R_c$ each represent hydrogen, or a hydrocarbon group having 1 to 16 carbon atoms, and include a heteroatom, wherein $R_c$ is not included when the nitrogen atom has a double bond,

[Chemical Formula 5]

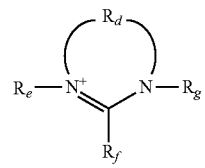

where, in Chemical Formula 5, $R_d$ represents a hydrocarbon group having 2 to 20 carbon atoms, and includes a heteroatom, and $R_e$, $R_f$, and $R_g$ each represent hydrogen, and a hydrocarbon group having 1 to 16 carbon atoms, and include a heteroatom,

[Chemical Formula 6]

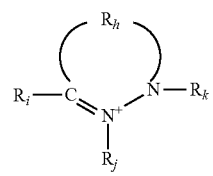

where, in Chemical Formula 6, $R_h$ represents a hydrocarbon group having 2 to 20 carbon atoms, and includes a heteroatom, and $R_i$, $R_j$, and $R_k$ each represent hydrogen, and a hydrocarbon group having 1 to 16 carbon atoms, and include a heteroatom,

[Chemical Formula 7]

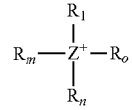

where, in Chemical Formula 7, Z represents a nitrogen, sulfur, or phosphorus atom, $R_l$, $R_m$, $R_n$, and $R_o$ each represent a hydrocarbon group having 1 to 20 carbon atoms and include a heteroatom, wherein $R_o$ is not included when Z is a sulfur atom.

7. The bistable liquid crystal cell of claim 1, wherein the bistable liquid crystal cell is formed so that the bistable liquid crystal cell switches between a transmission mode having a transmittance of 85% or more and a white mode having a transmittance of 83% or less.

8. The bistable liquid crystal cell of claim 1, wherein the liquid crystal layer further includes an anisotropic dye.

9. The bistable liquid crystal cell of claim 8, wherein the anisotropic dye is included in the liquid crystal layer in the ratio within the range of 0.01 wt % to 2 wt %.

10. The bistable liquid crystal cell of claim 8, wherein the bistable liquid crystal cell is formed so that the bistable liquid crystal cell switches between a transmission mode having a transmittance of 50% or more and a black mode having a transmittance of 40% or less.

11. The bistable liquid crystal cell of claim 1, wherein the liquid crystal layer further includes a polymer network.

12. The bistable liquid crystal cell of claim 11, wherein the polymer network is included in the liquid crystal layer in a ratio of 40 wt % or less.

13. The bistable liquid crystal cell of claim 1, further comprising an alignment layer provided on a side of the liquid crystal layer of the opposite substrates.

14. The bistable liquid crystal cell of claim 1, further comprising an electrode layer provided on a side of a liquid crystal layer of the opposite substrates.

15. An optical modulation apparatus comprising the bistable liquid crystal cell of claim 1.

16. A smart window comprising the bistable liquid crystal cell of claim 1.

* * * * *